J. A. MURRAY & C. N. WILT.
NON-SKID DEVICE.
APPLICATION FILED JULY 21, 1916.
1,215,302.
Patented Feb. 6, 1917.
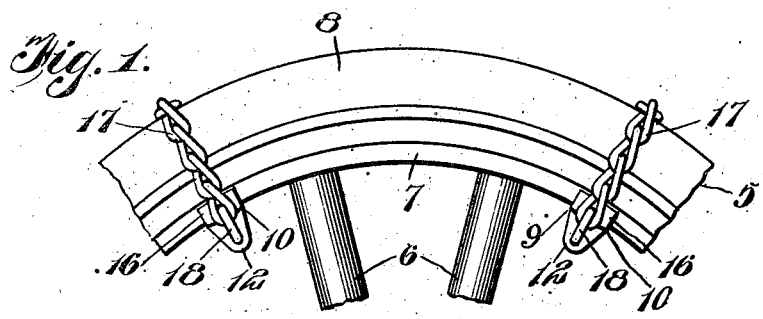
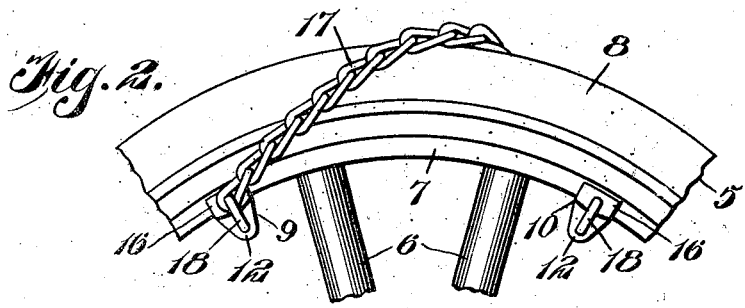
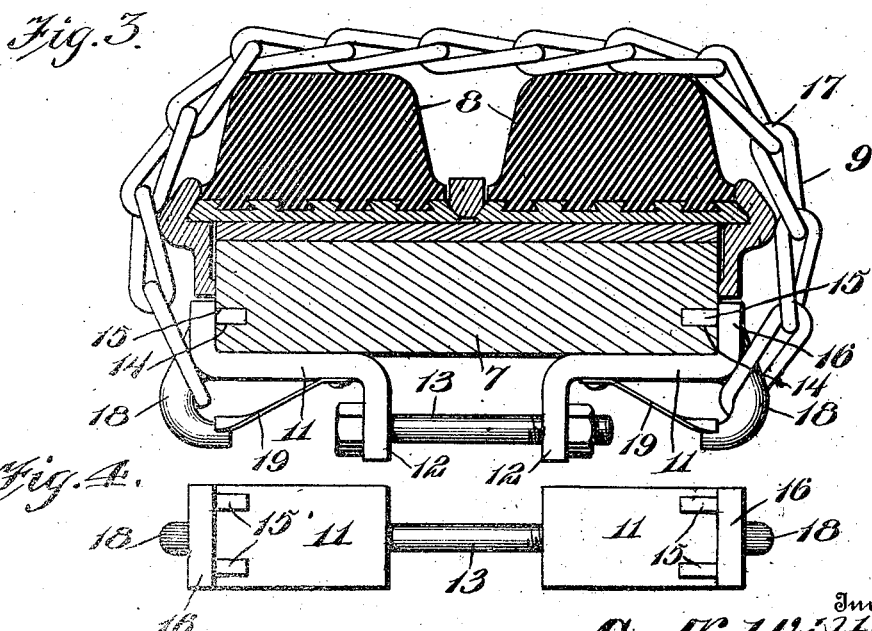
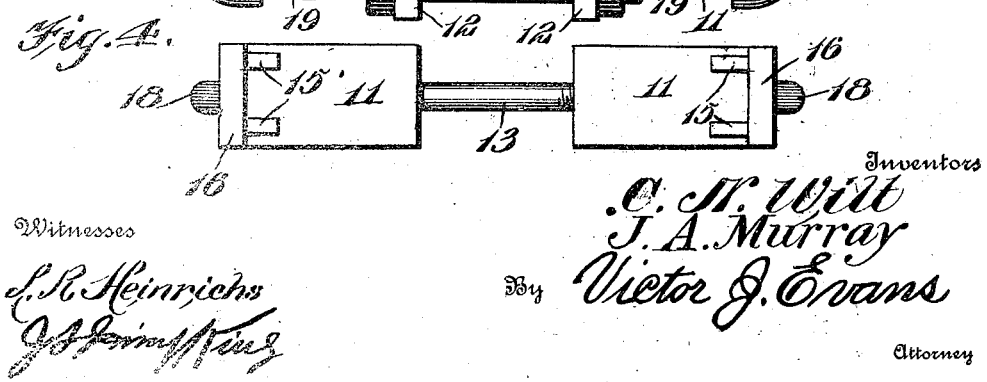
Witnesses
Inventors
C. N. Wilt
J. A. Murray
By Victor J. Evans
Attorney

UNITED STATES PATENT OFFICE.

JOHN A. MURRAY AND CHARLES N. WILT, OF PONTIAC, MICHIGAN.

NON-SKID DEVICE.

REISSUED

1,215,302.　　　Specification of Letters Patent.　　Patented Feb. 6, 1917.

Application filed July 21, 1916. Serial No. 110,592.

*To all whom it may concern:*

Be it known that we, JOHN A. MURRAY and CHARLES N. WILT, citizens of the United States, residing at Pontiac, in the county of Oakland and State of Michigan, have invented new and useful Improvements in Non-Skid Devices, of which the following is a specification.

This invention has for its object to provide a simple and inexpensive non-skidding device primarily adapted for use on motor trucks and exempting the tire from any appreciable wear.

A further object of the invention is the provision of a device of the above stated character, wherein each of the sections of the saddle is provided with means adapted to engage in openings formed in the felly for positively preventing the saddle from accidental movement or working circumferentially on the felly, thus preventing the saddle from cutting into the felly or spokes of the wheel.

A still further object of the invention is the provision of clamps formed on the free end of the saddle sections in order that the chains may be easily and readily connected to the tire either at right angles or diagonally thereof.

With the above and other objects in view, the invention consists in the novel features, details of construction and combination of parts which will hereinafter be more fully set forth, illustrated in the accompanying drawing and pointed out in the appended claims.

Figure 1 is a side elevation of a portion of the wheel showing the device applied thereto;

Fig. 2 is a similar view showing the manner of connecting the chains to the saddle sections for arranging the chains diagonally upon the tire;

Fig. 3 is a transverse sectional view; and

Fig. 4 is a top plan view of the saddle removed from the felly.

Referring more particularly to the drawing, the numeral 5 denotes a wheel having spokes 6 and to which is connected the felly 7. Secured upon the felly is a solid tire 8 adapting the wheel for use upon motor trucks.

Our improved anti-skidding device is designated generally by the character 9 comprising a saddle 10 embodying a pair of sections 11 formed on their confronting ends with depending apertured ears 12 for receiving an adjusting bolt 13. This saddle when in applied position is adapted to be clamped upon the felly with the adjusting bolt 13 interposed between the spokes 6 of the wheel. The outer side faces of the felly 7 of the wheel are formed with a series of concentrically arranged spaced sockets 14 adapted to receive the pairs of inwardly directed spurs 15 formed on the outer end lips 16 of each of the saddle sections 11, thereby positively retaining the saddle from moving or working circumferentially on the felly of the wheel. By this arrangement the saddle will not cause any cutting action of the felly or spokes of the wheel. Further advantages in having the prongs or bosses 15 engaging or seated within the sockets 14 of the felly, is to permit of the skid chains 17 being so connected with the saddle sections as to arrange the same diagonally across the solid tire of the wheel, if so desired.

The free end of the sections 11 of the saddle is formed with hooks 18 bent in a direction opposite to the direction of the lips 16, for permitting of a quick attachment or detachment of the chains 17 to the saddle. The chains are retained on the hooks 18 through the medium of a flat retaining spring 19. As illustrated in Fig. 1 of the drawing, when the chains are connected to the tire at right angles thereto, the opposite terminals of the anti-skid chains 17 engage with the horizontally alined hooks of each section of the saddle, whereas, when it is desirous of arranging the chains diagonally of the tire to prevent any accidental side skidding of the vehicle, the terminal of one chain is connected to one saddle while the terminal of the opposite chain is connected to one of the hooks of another saddle, as clearly shown in Fig. 2 of the drawing. It is to be further understood that the adjusting bolt 13, aside from holding the saddle upon the felly, further retains the prongs or bosses 15 firmly within the sockets 14. Another feature of the bolt 13 is to allow of the saddle being at all times retained on the rim or felly of the wheel, in order that a quick attachment of the chains to the wheel can be had, for instance, when it is desired to lift or raise the wheel of the vehicle out of sand, mud holes, ruts or the like.

The chains are preferably arranged loosely upon the tread of the tire, in order that the same may be readily removed without disturbing the adjustment of the clamps.

From the foregoing description, taken in connection with the accompanying drawing, the advantages of construction and of the method of operation will be readily apparent to those skilled in the art to which the invention relates, and while we have described the principles of operation of the invention, together with the device which we now consider to be the best embodiment thereof, we desire to have it understood that the device shown is merely illustrative, and that such changes may be made when desired as are within the scope of the claims appended thereto.

We claim:

1. The combination with a vehicle wheel having a felly formed with sockets, and a tire on said felly, a saddle detachably connected to the felly and terminally provided with angularly bent lips, means formed on the lips adapted to engage in the sockets of the felly for preventing any circumferential movement of the saddle, hooks formed on the terminals of the saddle and extending in opposite directions to the lips, and cross chains detachably connected with the hooks of the saddle and holding the same transversely on the tire.

2. A non-skidding device including a saddle comprising a pair of adjustably connected sections, each of said sections having an up-bent lip on the outer terminal thereof, inwardly extending prongs formed on the said lips, hooks formed on the outer terminals of each of the said sections and depending therefrom, and cross chains detachably connected with said hooks.

3. In combination with a vehicle wheel having its felly formed with a series of sockets; a tire on said felly, and a saddle detachably connected under the felly, said saddle comprising a pair of sections each provided on their confronting ends with depending apertured ears, a bolt extending through the apertures of the ears for adjustably connecting the saddle to said felly, the free end of each section of the saddle being bent to provide an upstanding lip, means formed integral with the lips for engagement in the sockets of the felly preventing any circumferential creeping movement of the saddle with respect to said felly, hooks formed on the outer faces of said lips and extending in an opposite direction to the lips, and cross chains detachably connected with the hooks of the saddle for holding the chains across the tire.

In testimony whereof we affix our signatures.

JOHN A. MURRAY.
CHARLES N. WILT.